106-90  AU 113  EX
4/22/80  OR  4,199,366

United States Patent [19]
Schaefer et al.

[11] 4,199,366
[45] Apr. 22, 1980

[54] FIBER-REINFORCED CEMENT-LIKE MATERIAL

[75] Inventors: Peter Schaefer, Flims; Marcel Capaul; Wolfgang Griehl, both of Chur; Peter Meier, Domat-Ems, all of Switzerland

[73] Assignee: Inventa AG fur Forschung und Patentverwertung, Zurich, Switzerland

[21] Appl. No.: 962,734

[22] Filed: Nov. 20, 1978

[30] Foreign Application Priority Data

Nov. 21, 1977 [CH] Switzerland .................. 014172/77

[51] Int. Cl.² ............................................ C04B 31/34
[52] U.S. Cl. ...................... 106/90; 106/97; 106/99; 106/104; 106/107; 106/109; 106/111
[58] Field of Search ............ 106/90, 97, 99, 107, 106/104, 109, 111; 264/185

[56] References Cited

U.S. PATENT DOCUMENTS

| | | | |
|---|---|---|---|
| 3,645,961 | 2/1972 | Goldfein | 106/90 |
| 3,751,547 | 8/1973 | Kawakami | 264/185 |
| 3,852,402 | 12/1974 | Tanaka | 264/185 |
| 4,132,556 | 1/1979 | Camprincoli | 106/90 |

FOREIGN PATENT DOCUMENTS

| | | | |
|---|---|---|---|
| 998070 | 10/1976 | Canada | 106/90 |
| 47-45171 | 11/1972 | Japan | 106/90 |
| 49-37407 | 10/1974 | Japan | 106/99 |
| 49-104917 | 10/1974 | Japan | 106/99 |

*Primary Examiner*—Brian E. Hearn
*Attorney, Agent, or Firm*—Bierman & Bierman

[57] ABSTRACT

The present invention provides for a novel fiber-reinforced cement-like material which is characterized by having short polyvinyl alcohol fibers in an amount of at least 2 volume % based on the total volume of said material. These fibers have an elongation at break of between about 4 and 8% and a modulus of more than 130 g/dtex. A process for the preparation of said material is also disclosed.

7 Claims, No Drawings

FIBER-REINFORCED CEMENT-LIKE MATERIAL

BACKGROUND OF THE INVENTION

The most common type of cement-like material is one which is reinforced with asbestos. This material is used in the preparation of, for example, pipes, tiles, wall coverings, vases, house, roof and chimney coverings, etc.

Asbestos-containing cement-like materials are relatively strong even at reduced thickness. The conventional asbestos containing cement-like substrates, however, have a relatively low shock resistance and are likely to break easily on impact with stone. This characteristic is particularly important when the asbestos-containing cement-like substrate is used for the preparation of pipes, tiles, wall coverings, etc.

It has already been suggested to increase the strength of the cement-like material by increasing the asbestos content. However, this method produces only a small increase in strength and is not recommended because of the expense and waste of material resulting from the increased amount of asbestos.

It has also been proposed to use natural or synthetic fibers to reinforce the cement matrix. If natural fibers such as cellulose, cotton and silk as well as man-made fibers such as polyamide, polyester and polypropylene fibers are added, some additional strength is achieved. However, not enough additional strength is achieved to consider this method a success.

Relatively good results are obtained by the addition of glass fibers to the cement-like substrate. In particular, an alkali-resistant glass fiber (for example, see Japanese Laid-Open Specification 104, 918/1974) produces the best results but is disadvantageous because of the high cost involved. Additionally, extensive research has proven that the use of glass fibers results in reduced strength of the product after a relatively short time.

Inorganic and organic fibers have also been used to reinforce cement-like materials. Japanese Laid-Open specification 104,917/1974 teaches that reinforced cement products can be prepared using mixtures of glass fiber and polyvinyl alcohol fibers. However, these products are not ideal, particularly because of their inferior bending strength.

SUMMARY OF THE INVENTION

The present inventors have found that cement-like substrates, having superior bending and impact strength, and which do not possess the above-mentioned disadvantages, can be made buy adding at least 2% by volume of particular short polyvinyl alcohol fibers to the cement-containing material. These fibers must exhibit a 4 to 8% elongation at break and a modulus of more than 130 g/dtex. These polyvinyl alcohol fibers (PVA fibers) represent the so called second generation PVA fibers. They are prepared with the addition of, for example, boric acid to the spinning solution and are subjected to a thermal post-treatment. The thus-obtained fibers are differentiated from first generation PVA fibers by their greater strength, water-insolubility, lower elasticity and high initial modulus.

The cement-like materials useful in the present invention include materials containing an inorganic cement and/or inorganic binding or adhesive material which is hardened by hydration. Particularly suitable binding agents which are hardened by hydration include, for example, Portland cement, alumina cement, iron Portland cement, trass cement, blast furnace cement and gypsum.

PVA fibers of the first generation are polymers of the general formula $(-CH_2-CH(OH)-)_n$ with molecular weights of, for example, 13,000 to 100,000 and a density of, for example, 1.23 to 1.30 and are generally prepared by the saponification of polyvinyl acetate (for example, see Rompps Chemie Lexikon, Vol. 7, p. 2776).

The second generation PVA fibers are also known in the art and can, for example, be prepared according to U.S. Pat. No. 3,987,140.

The PVA fibers according to the present invention are added to the cement-like substrate in an amount which provides at least 2% by volume, preferably 2 to 20%, by volume of these fibers in the resultant product. Fiber mixtures below 2% do not provide a cement-like material with the desired characteristics. Fiber mixtures above 20% by volume make the preparation of the desired products very expensive without any noteworthy improvement in the binding or impact strength.

The present fibers preferably have a length of between about 3 and 12 mm. The length of the individual fibers may be uniform or may vary. Ground fibers may also be used. The denier of the individual fibers may vary within a wide range, but, are preferably deniers of between about 1 and 5 dtex.

The present fibers may be uniformly distributed in the cement material. On the other hand, they may be placed in high concentration in shaped pieces in places which are particularly exposed to the action of mechanical forces. The fibers may also be added in the form of fiber fleeces, yarns, cords, gauzes, woven materials, etc. The cross-section of the fibers can take a variety of forms, especially resulting from physical and chemical variations in preparation processes. For example, the spinning solution material, the precipitation bath and the spinneret nozzles may be varied. In this manner, the preparation of round fibers, multilobal fibers, hollow fibers, porous fibers, etc. is facilitated. The outer fiber surface may be roughened, split or felted by physical post-treatment processes.

PVA fibers can easily be chemically modified because of their high chemical reactivity. Various functional groups such as carboxyl groups, amide groups, nitrile groups, phosphate groups, sulfate groups, etc. can be introduced by addition reactions or radical reactions. Brighteners or adhesive agents can be introduced onto or into the fibers by purely physical means and can provide aid in the anchoring of the PVA fibers in the cement-like material. By the methods described above, PVA fibers may be made inflammable, hydrophobic, or cross-linked. All PVA fibers modified in this way are suitable as fillers in the present invention.

According to the process of the present invention, polyvinyl alcohol fibers may be added alone to the cement-like material. However, it is preferable to add asbestos, glass or other synthetic or natural fibers alone or in combination. In addition to the reinforcing fibers, adjuvants such as cellulose waste, wood chips, "fibrids" (e.g. fibrids of polypropylene) and other fillers are frequently added to the reinforced material.

The nature of the present invention is more clearly described by the following examples which are submitted for illustrative purposes only and should not be read to limit or in any way redefine the invention described in Applicants' broadest claim.

BRIEF DESCRIPTION OF THE PREFERRED EMBODIMENTS

EXAMPLES

Four aqueous Portland cement suspensions were prepared and identified as samples 1–4, respectively. 12 weight % of chrysotile-asbestos (density 2.7) was added to sample 1. Samples 2 and 3 provided for the replacement of 50 volume % of this asbestos with 50 and 10 volume %, respectively of PVA fibers according to the present invention. Example 4 provided for the replacement of 50 volume % of asbestos with 50 volume % of conventional PVA fibers. Both types of PVA fibers had a density of 1.3.

Additional characteristics of both types of PVA fibers are shown in Table I. Fleeces of the fibers were prepared and hydrated under 100% relative humidity at 21° C. After 28 days, bending tensile strength and impact strength were measured in the hydrated state. The fleeces were prepared by a winding process wherein the cement suspensions were laid in the form of a coat on a wire grating of a layer machine so that the water ran off. The solids were then drawn over the wire grating on a continuous felt band in the form of a wet sheet and the latter was wound onto a drum. The results are summarized in Table II.

Table I

|  | Conventional Fibers | Present Fibers |
|---|---|---|
| Length | 6 mm | 6 mm |
| Elongation at break | 22% | 6.5% |
| A-Modulus | 65 p/dtex | 200 p/dtex |
| Tensile Strength | 4.5 p/dtex | 8.5 p/dtex |

Table II

| Sample | Asbestos Vol. % | PVA Vol. % | Bending Tensile strength kp/cm$^2$ | Impact Strength cm.kp/cm$^2$ | Density g/cm$^3$ |
|---|---|---|---|---|---|
| 1 | 100 | — | 320 ± 30 | 1.3 | 1.8 |
| 2 | 50 | 50 | 340 ± 30 | 2.3 | 1.8 |
| 3 | 90 | 10 | 362 | 2.0 | 1.8 |
| 4 | 50 | *50 | 205 ± 40 | 2.0 | 1.8 |

*Conventional PVA

Example 4 is a comparative example and shows the strength achieved when 50% of the asbestos is replaced by conventional PVA fibers. Examples 2 and 3 show the results achieved with the PVA fibers according to the present invention.

A 50% replacement of asbestos by PVA fibers according to the present invention provides for a considerably higher impact strength than that achieved when asbestos is used alone as an additive. The impact strength then remains virtually unaltered. In contrast, comparative example 4 shows considerably lower values, particularly in bending tensile strength. Also, the impact strength achieved is lower than that achieved with the use of the fibers of the present invention. Similar results are obtained using fibers having a length of 3 mm. and 12 mm.

What we claim is:

1. A fiber-reinforced cement-like material comprising at least 2 volume % of fibers of polyvinyl alchol having an elongation at break of between about 4 and 8%, a modulus of more than 130 g/dtex, and a length of between about 3 mm and 12 mm.
2. The material of claim 1 wherein said fibers have a denier of between about 1 and 5 dtex.
3. The material of claim 1 wherein said fibers are present in said material in amount of between about 2 and 20 volume %.
4. The material of claim 1 further comprising at least one cement-like material selected from the group consisting of Portland cement, alumina cement, iron Portland cement, trass cement, blast furnace cement, and gypsum.
5. The material of claim 1 wherein said fibers contain at least one number selected from brighteners and adhesive agents.
6. The material of claim 1 further comprising at least one member selected from the group consisting of asbestos, glass, synthetic fibers, natural fibers, and adjuvants.
7. The material of claim 6 wherein said adjuvants are selected from cellulose waste, wood chips, and fibrids.